United States Patent [19]
Komatsu et al.

[11] Patent Number: 5,976,433
[45] Date of Patent: Nov. 2, 1999

[54] POLYVINYL ALCOHOL-BASED HOLLOW FIBER MEMBRANE AND PROCESS FOR PRODUCING THE SAME

[75] Inventors: Kensaku Komatsu; Osamu Kusudo, both of Kurashiki, Japan

[73] Assignee: Kuraray Co., Ltd., Kurashiki, Japan

[21] Appl. No.: 08/998,041

[22] Filed: Dec. 23, 1997

Related U.S. Application Data

[62] Division of application No. 08/655,974, May 31, 1996, Pat. No. 5,789,081.

[30] Foreign Application Priority Data

Jun. 5, 1995 [JP] Japan .................................. 7-137803

[51] Int. Cl.$^6$ .................................................. B29C 65/00
[52] U.S. Cl. ................ 264/41; 210/500.23; 210/500.42; 264/514; 264/638; 264/640
[58] Field of Search .......................... 210/500.42, 500.23; 264/41, 514, 638, 640; 428/398

[56] References Cited

U.S. PATENT DOCUMENTS

| | | |
|---|---|---|
| 4,073,733 | 2/1978 | Yamauchi et al. . |
| 4,279,752 | 7/1981 | Sueoka et al. ..................... 210/500.42 |
| 4,316,009 | 2/1982 | Rinaldi et al. . |
| 5,132,059 | 7/1992 | Takahashi et al. . |
| 5,173,189 | 12/1992 | Hoshi et al. . |
| 5,380,588 | 1/1995 | Nishiyama et al. . |
| 5,455,114 | 10/1995 | Ohmory et al. . |
| 5,789,081 | 8/1998 | Komatsu et al. ....................... 428/398 |

FOREIGN PATENT DOCUMENTS

| | | |
|---|---|---|
| 54-15268 | 6/1979 | Japan . |
| 54-40654 | 12/1979 | Japan . |

*Primary Examiner*—Ana Fortuna
*Attorney, Agent, or Firm*—Oblon, Spivak, McClelland, Maier & Neustadt, P.C.

[57] ABSTRACT

A polyvinyl alcohol-based hollow fiber membrane having a ratio between the size of particles of 90% rejection and that of particles of 10% rejection of not more than 5, thus proving to have a sharp fractionating property, is produced by a process which comprises, on producing a polyvinyl alcohol-based hollow fiber membrane by dry-jet wet spinning or wet spinning, using a spinneret having heat insulating structure.

17 Claims, 4 Drawing Sheets

POLYVINYL ALCOHOL-BASED HOLLOW FIBER MEMBRANE AND PROCESS FOR PRODUCING THE SAME

This application is a Division of application Ser. No. 08/655,974, filed on May 31, 1996, now U.S. Pat. No. 5,789,081.

BACKGROUND OF THE INVENTION

1. Field of the Invention

The present invention relates to a polyvinyl alcohol-based hollow fiber membrane and a process for producing the same. More specifically, the present invention relates to a polyvinyl alcohol-based hollow fiber membrane having a sharp fractionating capability, with which the ratio between the size of particles of 90% rejection and that of particles of 10% rejection is not more than 5, and to a process for producing the same.

2. Description of the Prior Art

Hollow fiber membranes from polyvinyl alcohol (hereinafter referred to as PVA), which is representative of hydrophilic polymers, are widely put in actual uses as various separation membranes. PVA-based hollow fiber membranes are produced by, for example, a process which comprises extruding an aqueous solution of a vinyl alcohol-based polymer into an aqueous solution of a dehydrating agent such as sodium sulfate, a process which comprises extruding an aqueous solution of a vinyl alcohol-based polymer into an aqueous solution of an alkali such as sodium hydroxide and a process which comprises extruding an aqueous solution of a vinyl alcohol-based polymer containing boric acid or a borate into an aqueous alkaline solution of a dehydrating salt, such as an aqueous mixed solution of sodium hydroxide and sodium sulfate. See, for example, Japanese Patent Publication Nos. 15268/1979 and 40654/1979.

There has been in recent years an increasing demand for a separation membrane having sharp fractionating capability that can separate substances having only slightly different particle sizes. Intensive studies have been made to obtain a PVA-based hollow fiber membrane meeting this demand. However, it is difficult to obtain, by the above disclosed processes, a PVA-based hollow fiber membrane that is satisfactory in the fractionating capability. At present, membranes with unsatisfactory fractionating capability are therefore being used as they are. On the other hand, the objects to be separated by membrane separation become more sophisticated year by year, thereby requiring a membrane having sharper fractionating capability.

SUMMARY OF THE INVENTION

Accordingly, an object of the present invention is to provide a PVA-based hollow fiber membrane having a sharp fractionating capability.

Another object of the present invention is to provide a process for producing the above PVA-based hollow fiber membrane.

As a result of an intensive study to achieve the above objects, the present inventors found that: while performing spinning and coagulation with the external temperature such as coagulating bath temperature being kept at the same temperature as that of spinning dope gives nothing but a membrane having very small water permeability, decreasing the coagulating bath temperature and like temperatures leads to production of a membrane having improved water permeability but having no sharp fractionating capability. Based on these findings, the present inventors have further made a detailed study, while paying attention to the fact that the spinning dope cools at part of the spinneret to undergo phase separation, to find that controlling the temperature of that part of spinneret can produce a membrane having a sharp fractionating capability, and completed the invention.

Thus, the present invention provides a PVA-based hollow fiber membrane with which the ratio between the size of particles of 90% rejection and that of particles of 10% rejection is not more than 5.

The present invention also provides a process for producing PVA-based hollow fiber membranes, which comprises using, on producing a polyvinyl alcohol-based hollow fiber membrane by dry-jet wet spinning or wet spinning, a spinneret having a heat insulating structure.

BRIEF DESCRIPTION OF THE DRAWINGS

A more complete appreciation of the invention and many of the attendant advantages thereof will be readily obtained as the same become better understood by reference to the following detailed description when considered in connection with the accompanying drawings, wherein.

DETAILED DESCRIPTIONS OF THE PREFERRED EMBODIMENTS

The PVA-based hollow fiber membrane of the present invention has a sharp fractionating capability with which the ratio between the size of particles of 90% rejection and that of particles of 10% rejection is not more than 5. The ratio between the size of particles of 90% rejection and that of particles of 10% rejection as referred to in the present invention can be obtained by the following method. A 1% by weight aqueous dispersion is prepared from commercially available colloidal silica, polystyrene latex or like particles having a sharp size distribution and is used as a dope. The dope is subjected to circulation filtration under an external pressure of 0.5 kg/cm$^2$ through a one-end open type module having an effective length and an effective membrane area of 20 cm and about 280 cm$^2$, respectively, at a circulation linear speed of 30 cm/sec. At this time, 0.5 to 1.5 liter/m$^2$ of filtrate is sampled. The concentrations of the dope and the filtrate are measured and the rejection is calculated with the following formula (hereinafter "liter" is simply written as "l").

$$\text{Rejection (\%)} = \frac{[\text{dope conc.} - \text{filtrate conc. (wt \%)}]}{\text{dope conc. (wt \%)}} \times 100$$

Figure 4:
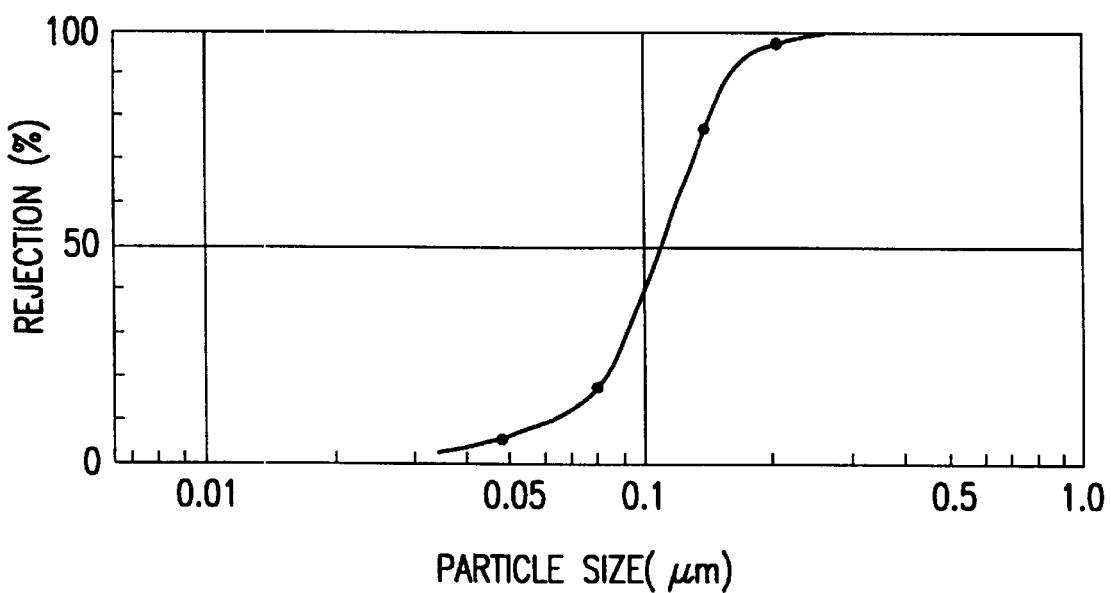
FIG. 4 is a particle fractionation curve of the PVA-based hollow fiber membrane of Example 1.

This procedure is followed for at least 3 particle groups having different sizes and a particle fractionation curve is prepared. From the curve, the size of particles of 90% rejection and that of particles of 10% rejection are read and the ratio between the two is calculated. FIG. 4 is an example of a particle fractionation curve thus prepared.

The hollow fiber membrane of the present invention is widely applicable to ultrafiltration through microfiltration. If the size of particles of 90% rejection becomes less than 0.1 μm, the water permeability will tend to decrease; while if the same size exceeds 1 μm, the mechanical strength of the hollow fiber membrane will often decrease. It is therefore desirable that the size of particles of 90% rejection be in a range of 0.01 to 1 μm.

The hollow fiber membrane of the present invention generally has an outer diameter of about 50 to 3,000 μm and a membrane thickness of 10 to 750 μm. The dimensions can be appropriately selected depending on the method of use, such as external pressure filtration or internal pressure circulation filtration.

The PVA-based hollow fiber membrane of the present invention may have any membrane surface structure, with no specific restrictions, including single pores of circular or elliptic shape, continuous pores, net-like micropores, slit-like micropores and the like. However, it is desirable that the outer surface and/or inner surface comprise slit-like micropores, which are more likely to have higher water permeability and sharper fractionating capability than other pore shapes.

Figure 5:
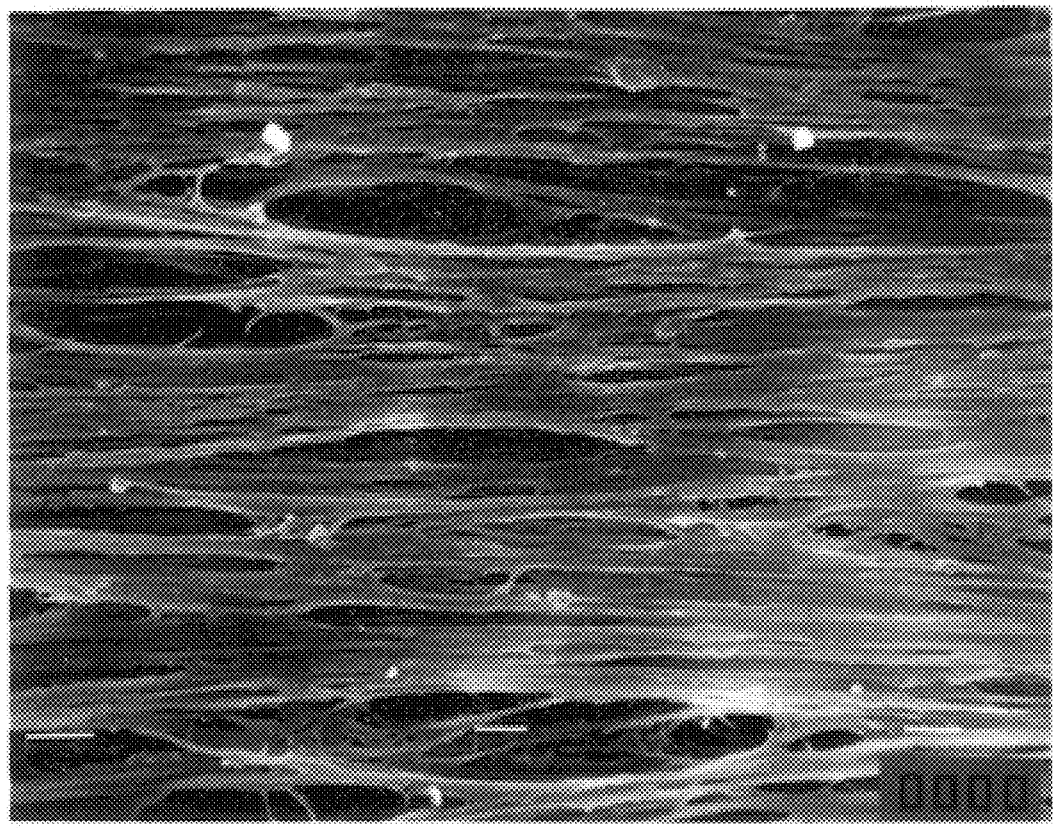
FIGS. 5 and 6 are electron photomicrographs with a magnification of 3,750 showing the inner and outer surfaces, respectively, of the PVA-based hollow fiber membrane of Example 1.
Figure 6:
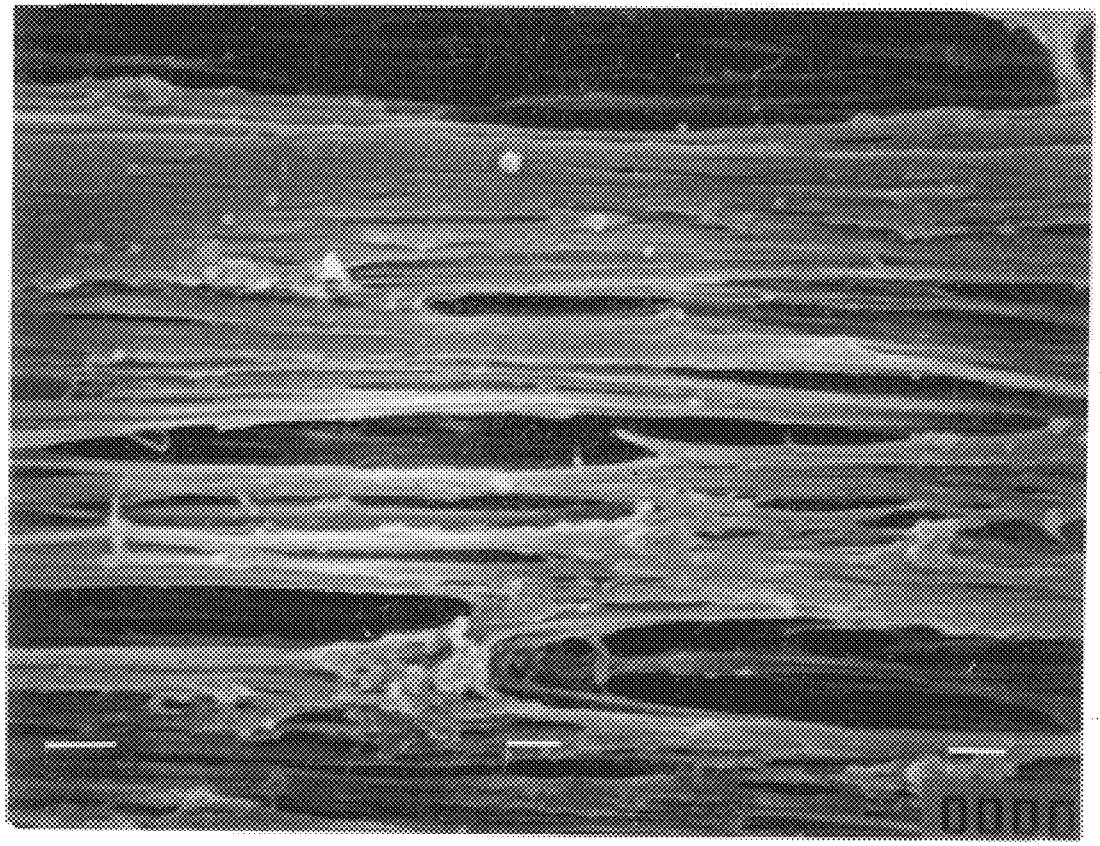

The slit-like micropores mean micropores thinly extending in the direction of hollow fiber axis and having a ratio between the length in the fiber axis direction and that in a direction perpendicular thereto of generally at least 3, preferably at least 5. FIGS. 5 and 6, which are scanning electron microphotographes of the inner and outer surfaces of the membrane obtained in Example 1, show slit-like micropores having a ratio between the length in the fiber axis direction and that in a direction perpendicular thereto of about 12 for outer surface and about 6 for inner surface.

There are no specific restrictions with respect to the cross-sectional structure of the membrane either, and the structure includes sponge-structure, finger-structure and the like, distributed uniformly or anisotropically throughout the cross-section.

The process for producing PVA-based hollow fiber membranes according to the present invention is described next. The spinning dope used for the spinning of the PVA-based hollow fiber membrane is generally a solution of a vinyl alcohol-based polymer and a pore-forming agent in a common solvent for the two components.

The vinyl alcohol-based polymer used in the present invention includes PVAs having an average degree of polymerization of 500 to 16,000 and a degree of saponification of 85 to 100 mole %, modified PVAs such as partially acetalized one, copolymers (including block copolymers and grafted copolymers) of vinyl alcohol with not more than 20 mole % of ethylene, propylene, vinylpyrrolidone, vinyl chloride, vinyl fluoride, methyl methacrylate, acrylonitrile, itaconic acid or the like and derivatives thereof. Vinyl alcohol-based polymers having a larger molecular weight can be spun at a lower concentration, thereby being capable of producing membranes with higher water permeability. In this case, moreover, the resulting membranes have higher mechanical strength thanks to increased molecular entanglement. Vinyl alcohol-based polymers having an average degree of polymerization of at least 1,700 are therefore preferably used. The concentration of the vinyl alcohol-based polymer used is, differing depending on the molecular weight, generally 1 to 50% by weight, preferably 3 to 20% by weight.

Examples of usable pore-forming agents are glycols, e.g. polyethylene glycol having an average molecular weight of 200 to 4,000,000, polypropylene glycol, tetraethylene glycol, triethylene glycol and ethylene glycol; alcohols, e.g. methanol, ethanol and propanol; polyhydric alcohols, e.g. glycerin and butanediol; and esters, e.g. ethyl lactate and butyl lactate. These pore-forming agents may be used either singly or in combination of 2 or more. The amount of the pore-forming agent to be added differs depending on the type of the vinyl alcohol-based polymer used and that of itself, but should desirably be so selected that the resulting spinning dope has an upper critical separation temperature (hereinafter referred to as "UCST") within the later specified range.

Examples of solvents usable for preparing the spinning dope are water, alcohol/water, dimethyl sulfoxide (DMSO), dimethylformamide (DMF), dimethylacetamide (DMAc) and N-methylpyrrolidone, among which water is preferred from the viewpoint of commercial production.

The spinning dope may suitably incorporate, in addition to the above components, boric acid which accelerates coagulation, an acid such as acetic acid which prevents the vinyl alcohol-based polymer from forming cross-linkage, a surfactant which improves spinning stability, an antifoam and like additives.

Stirring and dissolving these components at a high temperature of generally at least 95° C. gives a spinning dope. This spinning dope, being of high temperature-soluble type, has a UCST and becomes a homogeneous transparent solution at a high temperature. The UCST means the temperature at which a spinning dope, when its temperature is decreased gradually, changes from a transparent to an opaque condition. This is also called whitening point or cloudy point and is one of the important elements in producing a hollow fiber membrane having a sharp fractionating capability. The UCST is generally in a range of 30 to 95° C., preferably 50 to 90° C. With the UCST being lower than 30° C., the water permeability tends to decrease; and with that exceeding 95° C., the spinning dope often has poor storability, thereby deteriorating the spinning stability.

The spinning dope thus prepared is, together with an internal coagulating liquid, extruded through a spinneret directly (wet spinning), or after passing through air (dry-jet wet spinning), into a coagulating bath to be coagulated therein, to form the PVA-based hollow fiber membrane of the present invention.

The external coagulating bath mainly comprises an aqueous coagulating agent. Examples of the aqueous coagulating agent are aqueous solutions of dehydrating salts such as sodium sulfate and those of alkaline substances such as sodium hydroxide and ammonia, which may be used singly or in combination. Besides these aqueous coagulating agents, organic coagulating agents with which vinyl alcohol-based polymer is coagulatable, such as methanol and ethanol, may also be used alone or in combination with water.

The internal coagulating liquid may be the same solution as the above external coagulating bath, or a gas such as air, nitrogen or ammonia may be used. Also usable are organic solvents having no coagulating power for vinyl alcohol-based polymers and being immischible with the solvent used for the spinning dope, such as hexane and liquid paraffin.

The compositions of the external coagulating bath and internal coagulating liquid are suitably selected according to the fractionating capability of the desired membrane. Here, it is desirable to maintain the temperatures of the external coagulating bath and internal coagulating liquid below the UCST of the spinning dope. This is because, by doing so the spinning dope is cooled to accelerate microphase separation, so that a very porous membrane can be formed. The difference between the temperatures of the coagulating bath and liquid and the UCST is more preferably at least 30° C.

Metallic spinnerets are generally used for producing PVA-based hollow fiber membranes, since high degree of precision is required. Conventional spinnerets for producing hollow fiber membranes have an annular-shape nozzle as shown, for example, in FIG. 3. Through this type of spinneret the spinning dope is extruded into a hollow capillary shape and coagulated by action of the internal coagulating liquid and external coagulating bath, to yield a hollow fiber membrane.

In the present invention, it is important that the spinneret used have a heat insulating structure. The part of a spinneret where the spinning dope contacts the internal coagulating liquid or external coagulating bath is generally made of a metal having excellent corrosion resistance, such as gold, platinum or stainless steel. A heat insulating structure may be applied to the outside and/or inside of the spinneret, but it is preferably applied to the inside, which more likely achieves sharp fractionating capability. The part of the spinneret, where the spinning dope contacts the coagulating bath or the coagulating liquid, may be constituted of a plastic having a heat insulating property.

Figure 1:
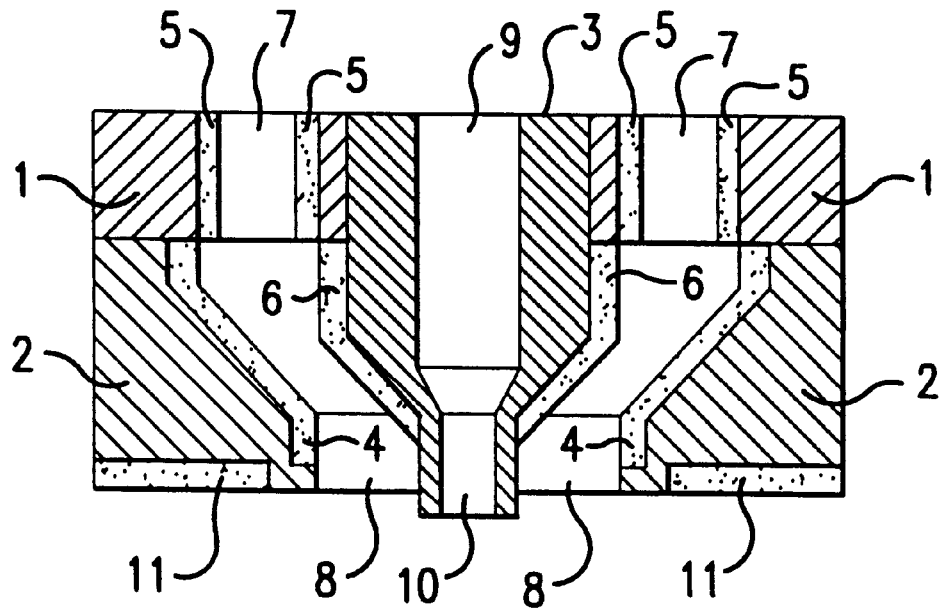
FIG. 1 is a schematic cross-sectional view showing an example of the spinneret used in the present invention.

FIG. 1 shows an example of a spinneret having a heat insulating structure on both its outside and inside. The spinneret consists of an upper nozzle and a lower nozzle, with the clearance between the two being sealable liquid-tight. 1 is the metal member of the upper nozzle, 2 that of the lower nozzle and 3 a metallic pipe for passing the internal coagulating liquid. A heat insulating member 4 is provided on the inner surface of the lower nozzle and a heat insulating member 5 covers the passage for the spinning dope of the upper nozzle. Part of the metallic pipe of the upper nozzle is covered with a heat insulating member 6. The spinning dope enters at 7 and leaves at 8, while the internal coagulating liquid enters at 9 and leaves at 10. 11 is a heat insulating member for the outer surface of the nozzle. The tip of the metallic pipe 3 may be positioned higher or lower than, or at the same level with, the level of the bottom surface of the lower nozzle. FIG. 1 is an example, where the tip of the metallic pipe 3 projects down below the level of the bottom surface of the lower nozzle.

The heat insulating member 6 desirably covers most of the area where the spinning dope is distributed around the metallic pipe 3 and may cover the entire length of the metallic pipe 3. The heat insulating members 4, 5, 6 and 11 may be of any material that has a smaller coefficient of thermal conductivity than that of gold, platinum, stainless steel or like metals used. Examples of usable materials for this purpose are heat resistant resins, e.g. fluororesins such as teflon, polysulfone resins, polyphenylene oxide resin, polyphenylene sulfide resin, polyetheretherketone resins, phenol resins and epoxy resins; and ceramics such as alumina. These heat insulating members are bonded to the intended part with, for example, water-resistant adhesives. The thickness of the heat insulating members cannot be specified indiscriminately and should be suitably selected according to the material and the desired hollow fiber membrane.

Figure 2:
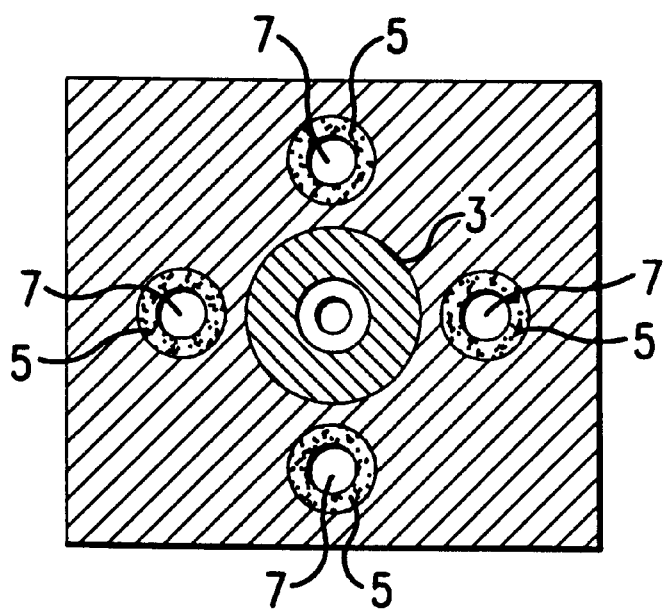
FIG. 2 is a plan of the spinneret of FIG. 1.

FIG. 2 is a plan seen from above of the spinneret of FIG. 1. While FIGS. 1 and 2 show a spinneret having only one hole, the number of holes per spinneret is not limited to one but may be a plurality.

The outer and inner diameters of the hole for extruding the spinning dope is suitably selected according to the diameter of the desired hollow fiber membrane, while the bath draft should be taken into consideration. The bath draft herein means the ratio between the take-up speed of the coagulated filament and the linear velocity at the nozzle exit of the spinning dope. Higher bath draft is preferred since it tends to provide the resulting hollow fiber membrane with slit-like micropores having sharper fractionating capability and higher water permeability. However, too high a bath draft often causes troubles during spinning, such as filament breakage. On the other hand, too low a bath draft tends to cause slackening in the coagulating bath. It is therefore desirable to set the bath draft at 1.0 to 20.

Although the mechanism involved in the spinneret having a heat insulating structure leading to production of PVA-based hollow fiber membranes having sharp fractionating capability is not quite clear, it is considered to be due to the following. That is, where a spinning dope is spun through a conventional spinneret, if the temperatures of the external coagulating bath and internal coagulating liquid are set lower than the UCST of the spinning dope, cooling with the upper and lower nozzles and metallic pipe causes the spinning dope inside the spinneret to undergo phase separation partially, thereby yielding a membrane having a non-uniform membrane structure.

On the other hand, use of a spinneret having a heat insulating structure as used in the present invention prevents the spinning dope from undergoing the partial phase separation caused by cooling inside the spinneret. As a result, a membrane having a uniform structure and sharp fractionating capability can be obtained. Besides, in this case it is possible to set the spinning dope temperature at near the UCST and, at the same time, to set the coagulating bath temperature considerably lower than the UCST. Then, microphase separation of the spinning dope in the coagulating bath is accelerated, so that a porous membrane having high water permeability can be produced. Furthermore, spinning with higher bath draft than in the usual process becomes possible thanks to the absence of local phase separation, thereby readily forming slit-like micropores.

The PVA-based hollow fiber membrane coagulated in the coagulating bath can be, as necessary, subjected to drawing, neutralization, water washing, wet heat treatment, sodium sulfate substitution, drying and like treatments. It is also possible to modify the membrane by, for example, acetalization with a monoaldehyde and/or polyaldehyde, e.g. formaldehyde, glutaraldehyde, benzaldehyde, glyoxal and nonanedial, esterification or etherification, and/or to crosslink the membrane with a methylol or polyisocyanate, singly or in combination. Heat drawing and/or heat treatment can also be carried out after spinning, and further after such treatment the above various modification treatments may be done.

The PVA-based hollow fiber membranes of the present invention, having sharp fractionating capability, is effective in separating different substances having close particle sizes and can be used for various industrial purposes, e.g. purifying solvents and oils, recovering effective substances from used solvents, treating waste liquids or waste water, purifying sugar liquid, treating proteins and purifying plating liquids; medical applications, e.g. blood filtration and separation of plasma and like uses.

EXAMPLES

Other features of the invention will become apparent in the course of the following detailed descriptions of exemplary embodiments which are given for illustration of the invention and are not intended to be limiting thereof.

Example 1

Water was added to a PVA (PVA-124; made by Kuraray Co., Ltd.) having a degree of saponification of 98.4 mole % and an average degree of polymerization of 2,400, a polyethylene glycol (PEG#600, made by Sanyo Chemical Industries) having an average molecular weight of 600, boric acid and acetic acid and the mixture was dissolved by heating to 100° C. to yield an aqueous solution containing 17.0% by weight of the PVA, 26.5% by weight of the polyethylene glycol, 0.7% by weight of boric acid and 0.07% by weight of acetic acid. The solution was a high temperature soluble type dope having a UCST of 80° C. This solution was used as spinning dope and wet spinning was conducted with a spinneret as shown in FIG. 1, at 85° C. The external coagulating bath and internal coagulating liquid both comprised an aqueous mixed solution of 40 g/l of sodium hydroxide and 200 g/l of sodium sulfate and had the same temperature of 27° C. The bath draft was set at 2.0. The hollow fiber membrane obtained was immersed in an aqueous solution of glutaraldehyde/sulfuric acid/sodium sulfate (=5/30/200 g/l) at 60° C. for 3 hours to undergo crosslinking, to yield a PVA-based hollow fiber membrane which was insoluble in hot water.

The membrane obtained had an outer diameter and an inner diameter of 1.1 mm and 0.6 mm, respectively, an effective length and an effective membrane area of 20 cm and 280 $cm^2$, respectively, and a water permeability as measured by conducting external pressure filtration with a one end open type module under a filtration pressure of 1 $kg/cm^2$ of 1,100 $l/m^2 \cdot hr \cdot kg/cm^2$. The membrane showed rejections of 7% for a dispersion of 0.045-$\mu$m colloidal silica, and 18%, 78% and 98% for dispersions of polystyrene latexes of 0.08 $\mu$m, 0.12 $\mu$m and 0.2 $\mu$m, respectively. Based on these data, a particle fractionation curve was prepared as shown in FIG. 4. From this curve, the particle size of 0.15 $\mu$m at 90% rejection and that of 0.06m $\mu$m at 10% rejection were read, and the ratio between the particle sizes of 90% rejection and 10% rejection was obtained by calculation, to be 2.5. The membrane had, as shown in FIGS. 5 and 6, a slit-like micropore structure on both outer surface and inner surface. The cross-section had a fairly uniform sponge structure.

Example 2

Water was added to a PVA (PVA-140H; made by Kuraray Co., Ltd.) having a degree of saponification of 99.7 mole % and an average degree of polymerization of 4,000, a polyethylene glycol having an average molecular weight of 600, boric acid and acetic acid and the mixture was dissolved by heating to 100° C. to yield an aqueous solution containing 14.0% by weight of the PVA, 22.5% by weight of the polyethylene glycol, 0.5% by weight of boric acid and 0.3% by weight of acetic acid. The solution was a high temperature soluble type dope having a UCST of 81° C. This solution was used as spinning dope and wet spinning was conducted with a spinneret as shown in FIG. 1, at 82° C. The external coagulating bath comprised an aqueous mixed solution of 60 g/l of sodium hydroxide and 200 g/l of sodium sulfate. The internal coagulating liquid comprised an aqueous mixed solution of 40 g/l of sodium hydroxide and 200 g/l of sodium sulfate. Both had the same temperature of 27° C. The bath draft was set at 2.0. The hollow fiber membrane obtained was immersed in an aqueous solution of glutaraldehyde/sulfuric acid/sodium sulfate (=5/30/200 g/l) at 60° C. for 3 hours to undergo crosslinking, to yield a PVA-based hollow fiber membrane which was insoluble in hot water.

The membrane obtained had an outer diameter and an inner diameter of 1.1 mm and 0.6 mm, respectively and a water permeability as determined in the same manner as in Example 1 of 2,200 $l/m^2 \cdot hr \cdot kg/cm^2$. The fractionation characteristics were tested in the same manner. That is, from the particle fractionation curve prepared from measurements on the 4 types of particles having different particle sizes, the particle size of 0.35 $\mu$m at 90% rejection and that of 12 $\mu$m at 10% rejection were read. The ratio between the particle sizes of 90% rejection and 10% rejection was obtained by calculation, to be 2.9. The membrane had a slit-like micropore structure on both outer surface and inner surface. The cross-section had a fairly uniform sponge structure.

Comparative Example 1

Figure 3:
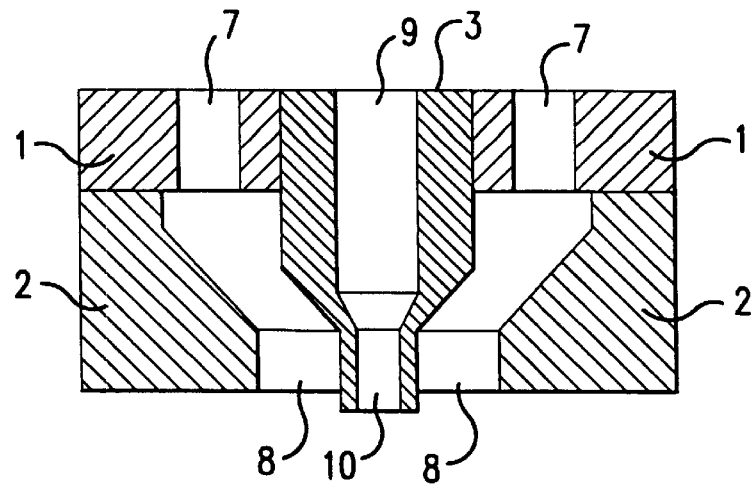
FIG. 3 is a schematic cross-sectional view of a conventional spinneret.

Wet spinning was carried out in the same manner as in Example 1 except that a spinneret as shown in FIG. 3 was used. The spinning dope was cooled down to a large extent, so that a satisfactory hollow fiber membrane could not be obtained.

Comparative Example 2

Comparative Example 1 was repeated except that the temperature of the spinning dope was set at 95° C. The hollow fiber membrane obtained by coagulation was subjected to crosslinking treatment in the same manner as in Example 1, to yield a PVA-based hollow fiber membrane having the same outer and inner diameters as those of Example 1. The membrane had a water permeability as determined in the same manner as in Example 1 of 500 $l/m^2 \cdot hr \cdot kg/cm^2$. Also in the same manner as in Example 1, from the particle fractionation curve prepared from measurements on the 4 types of particles having different particle sizes, the particle size of 0.4 $\mu$m at 90% rejection and that of 0.04 $\mu$m at 10% rejection were read. The ratio between the particle sizes of 90% rejection and 10% rejection was obtained by calculation, to be 10.0.

Example 3

The hollow fiber membranes obtained in Example 1 and Comparative Example 2 were tested for bacteria retention capability in accordance with JIS K3835. With the hollow fiber membrane of Example 1, the filtrate showed no test bacteria (Pseudomonas Demineuta), thus proving complete retention. On the other hand, with the hollow fiber membrane of Comparative Example 2, the filtrate contained $5 \times 10^3$ pieces of the test bacteria, thus proving incomplete retention.

Examples 4 Through 6

Water was added to a PVA (PVA-124; made by Kuraray Co., Ltd.) having a degree of saponification of 98.4 mole % and an average degree of polymerization of 2,400, a polyethylene glycol having an average molecular weight of 600, boric acid and acetic acid and the mixture was dissolved by heating to 100° C. to yield an aqueous solution containing 16.0% by weight of the PVA, 26.0% by weight of the polyethylene glycol, 0.7% by weight of boric acid and 0.3% by weight of acetic acid. The solution was a high temperature soluble type dope having a UCST of 76° C. This solution was used as spinning dope and wet spinning was conducted with a spinneret as shown in FIG. 1, at 82° C. The bath draft was set at 1.0, 8.0 or 17.0, to produce hollow fiber membranes.

The external coagulating bath comprised an aqueous mixed solution of 20 g/l of sodium hydroxide and 200 g/l of sodium sulfate and the internal coagulating liquid comprised an aqueous solution of 40 g/l of sodium hydroxide. The temperature of the external coagulating bath was set at 25° C., while that of the internal coagulating liquid at 40° C. The hollow fiber membranes obtained were immersed in an aqueous solution of glutaraldehyde/sulfuric acid/sodium sulfate (=2.5/30/200 g/l) at 60° C. for 1 hour and then in one of formaldehyde/sulfuric acid/sodium sulfate (=100/200/200 g/l) at 60° C. for 3 hours to undergo crosslinking, to yield three PVA-based hollow fiber membranes which were insoluble in hot water.

Table 1 shows the characteristics of the membranes thus obtained. The following is understood from the table. The higher the bath draft, the higher the water permeability and the smaller the ratio between the particle sizes of 90% rejection and 10% rejection. With respect to the membrane surface structure, the higher the bath draft, the larger the length of slit-like micropores in the fiber axis direction.

$\mu$m at 90% rejection and that of 0.25 $\mu$m at 10% rejection were read. The ratio between the particle sizes of 90% rejection and 10% rejection was obtained by calculation, to be 3.2. The membrane had a slit-like micropore structure on the inner surface and continuous pores having a relatively circular shape on the outer surface. The cross-section had an anisotropic sponge structure in which the pore diameter increased gradually from the inner to outer surface.

Example 8

Wet spinning was conducted at 95° C. with the spinning dope used in Example 1 and a spinneret as shown in FIG. 1. The external coagulating bath comprised an aqueous mixed solution of 60 g/l of sodium hydroxide and 200 g/l of sodium sulfate and internal coagulating liquid comprised an aqueous mixed solution of 40 g/l of sodium hydroxide and 200 g/l of sodium sulfate. The temperatures of the external coagulating bath and internal coagulating liquid were 25° C. and 50° C.,

TABLE 1

| Ex. | Bath draft | Membrane diameter ($\mu$m) outer/inner | Water permeability 1) | Fractionating capability | | Membrane structure | | |
|---|---|---|---|---|---|---|---|---|
| | | | | 90% rejection | Ratio | Outer surface | Inner surface | Cross-section |
| 4 | 1.0 | 450/309 | 1,800 | 0.21 | 4.0 | Oval | Oval | Sponge |
| 5 | 8.0 | 450/300 | 2,200 | 0.22 | 2.4 | Slit | Slit | Sponge |
| 6 | 17.0 | 450/300 | 2,500 | 0.24 | 2.3 | Slit | Slit | Sponge |

1) unit: $1/m^2 \cdot hr \cdot kg/cm^2$

Example 7

Water was added to a PVA having a degree of saponification of 98.5 mole % and an average degree of polymerization of 16,000, a polyethylene glycol having an average molecular weight of 1,000, ethylene glycol, boric acid and acetic acid and the mixture was dissolved by heating to 100° C. to yield an aqueous solution containing 4.0% by weight of the PVA, 23.0% by weight of the polyethylene glycol, 5.0% by weight of ethylene glycol, 0.2% by weight of boric acid and 0.02% by weight of acetic acid. The solution was a high temperature soluble type dope having a UCST of 60° C. This solution was used as spinning dope and dry-jet wet spinning was conducted with a spinneret as shown in FIG. 1, at 80° C.

The running length in air was set at 5 cm. The external coagulating bath comprised an aqueous mixed solution of 120 g/l of sodium hydroxide and 60 g/l of sodium sulfate and the internal coagulating liquid comprised an aqueous solution of 60 g/l of sodium hydroxide. The temperatures of the external coagulating bath and internal coagulating liquid were both 30° C. The bath draft was set at 2.0. The hollow fiber membrane obtained was immersed in an aqueous solution of glutaraldehyde/sulfuric acid/sodium sulfate (=2.5/30/200 g/l) at 60° C. for 1 hour and then in an aqueous solution of formaldehyde/sulfuric acid/sodium sulfate (=100/200/200 g/l) at 60° C. for 3 hours to undergo crosslinking, to yield a PVA-based hollow fiber membrane which was insoluble in hot water.

The membrane obtained had an outer diameter and an inner diameter of 1.1 mm and 0.6 mm, respectively, and a water permeability as obtained in the same manner as in Example 1 of 5,000 $1/m^2 \cdot hr \cdot kg/cm^2$. Also in the same manner as in Example 1, from the particle fractionation curve prepared from measurements on the 4 types of particles having different particle sizes, the particle size of 0.8 respectively. The bath draft was set at 1.3. The hollow fiber membrane obtained was immersed in an aqueous solution of glutaraldehyde/sulfuric acid/sodium sulfate (=5/30/200 g/l) at 60° C. for 3 hours to undergo crosslinking, to yield a PVA-based hollow fiber membrane which was insoluble in hot water.

The membrane obtained had an outer diameter and an inner diameter of 2.0 mm and 1.2 mm, respectively, and a water permeability as obtained in the same manner as in Example 1 of 400 $1/m^2 \cdot hr \cdot kg/cm^2$. Also in the same manner as in Example 1, from the particle fractionation curve prepared from measurements on the 4 types of particles having different particle sizes, the particle size of 0.02 $\mu$m at 90% rejection and that of 0.008 $\mu$m at 10% rejection were read. The ratio between the particle sizes of 90% rejection and 10% rejection was obtained by calculation, to be 2.5. The membrane had a slit-like micropore structure on both of the inner surface and the outer surface. The cross-section had a fairly uniform sponge structure.

Example 9

Water was added to a PVA (PVA-117, made by Kuraray Co., Ltd.) having a degree of saponification of 98.5 mole % and an average degree of polymerization of 1,700, a polyethylene glycol (PEG#600, made by Sanyo Chemical Industries) having an average molecular weight of 600, boric acid and acetic acid and the mixture was dissolved by heating to 100° C. to yield an aqueous solution containing 18.0% by weight of the PVA, 25.5% by weight of the polyethylene glycol, 0.8% by weight of boric acid and 0.08% by weight of acetic acid. The solution was a high temperature soluble type dope having a UCST of 80° C. This solution was used as spinning dope and wet spinning was conducted with a spinneret as shown in FIG. 1, at 85° C.

The external coagulating bath comprised an aqueous mixed solution of 60 g/l of sodium hydroxide and 200 g/l of sodium sulfate and internal coagulating medium comprised air. The temperatures of the external coagulating bath and internal coagulating medium were both 25° C. The bath draft was set at 2.0. The hollow fiber membrane obtained was immersed in an aqueous solution of glutaraldehyde/sulfuric acid/sodium sulfate (=5/30/200 g/l) at 60° C. for 3 hours to undergo crosslinking, to yield a PVA-based hollow fiber membrane which was insoluble in hot water.

The membrane obtained had an outer diameter and an inner diameter of 1.1 mm and 0.6 mm, respectively, and a water permeability as obtained in the same manner as in Example 1 of 700 $l/m^2 \cdot hr \cdot kg/cm^2$. Also in the same manner as in Example 1, from the particle fractionation curve prepared from measurements on the 4 types of particles having different particle sizes, the particle size of 0.13 μm at 90% rejection and that of 0.04 μm at 10% rejection were read. The ratio between the particle sizes of 90% rejection and 10% rejection was obtained by calculation, to be 3.3. The membrane had a slit-like micropore structure on the outer surface and single pores having a relatively circular shape on the inner surface. The cross-section had a fairly uniform sponge-structure.

Obviously, numerous modifications and variations of the present invention are possible in light of the above teachings. It is therefore to be understood that within the scope of the appended claims, the invention may be practiced otherwise than as specifically described herein.

What is claimed is:

1. A process for producing a polyvinyl alcohol-based hollow fiber membrane, which comprises forming said polyvinyl alcohol-based hollow fiber membrane by dry-jet wet spinning or wet spinning of a spinning dope with a spinneret having a heat insulated structure, thereby preventing said spinning dope from undergoing partial phase separation by cooling in the spinneret.

2. The process of claim 1, wherein said spinning dope comprises a solution of a vinyl alcohol-based polymer as a principal component, a pore-forming agent and a solvent capable of dissolving said vinyl alcohol-based polymer and said pore-forming agent and having an upper critical separation temperature of from about 30 to 95° C.

3. The process of claim 2, which further comprises spinning the spinning dope at a temperature of an external coagulating bath with an internal coagulating liquid being set lower than said upper critical separation temperature.

4. The process of claim 2, wherein said pore-forming agent is selected from the group consisting of polyethylene glycol, polypropylene glycol, tetraethylene glycol, triethylene glycol, ethylene glycol, lower alkyl alcohols, polyhydric alcohols and lower alkyl esters.

5. The process of claim 4, wherein said polyhydric alcohol is glycerine or butanediol or a mixture thereof.

6. The process of claim 4, wherein said lower alkyl ester is ethyl lactate or butyl lactate or a mixture thereof.

7. The process of claim 2, wherein said solvent is selected from the group consisting of water, alcohol/water, dimethyl sulfoxide, dimethylformamide, dimethylacetamide and N-methylpyrrrolidone.

8. The process of claim 7, wherein said solvent is water.

9. The process of claim 2, wherein said spinning dope further comprises boric acid, acetic-acid, a surfactant or an anti-foaming agent or a mixture thereof.

10. The process of claim 9, wherein said spinning dope has a an upper critical separation temperature of from 50 to 90° C.

11. The process of claim 1, wherein said vinyl alcohol-based polymer has a degree of polymerization of from about 500 to 16,000.

12. The process of claim 11, wherein said vinyl alcohol-based polymer has a degree of polymerization of at least about 1,700.

13. The process of claim 1, wherein a bath draft thereof is set at about 1.0 to 20.0.

14. The process of claim 1, wherein the spinning dope has a concentration of vinyl alcohol-based polymer of from about 1 to 50% by weight.

15. The process of claim 14, wherein the spinning dope has a concentration of vinyl alcohol-based polymer of from about 3 to 20% by weight.

16. The process of claim 1, which further comprises treating said formed polyvinyl alcohol-based hollow fiber membrane with treatment comprising drawing, neutralization, water washing, wet heat treatment, sodium sulfate substitution, membrane modification or drying or a combination thereof.

17. The process of claim 16, wherein said membrane modification comprises acetalization, etherification, esterification or crosslinking.

* * * * *